United States Patent Office 2,927,344
Patented Mar. 8, 1960

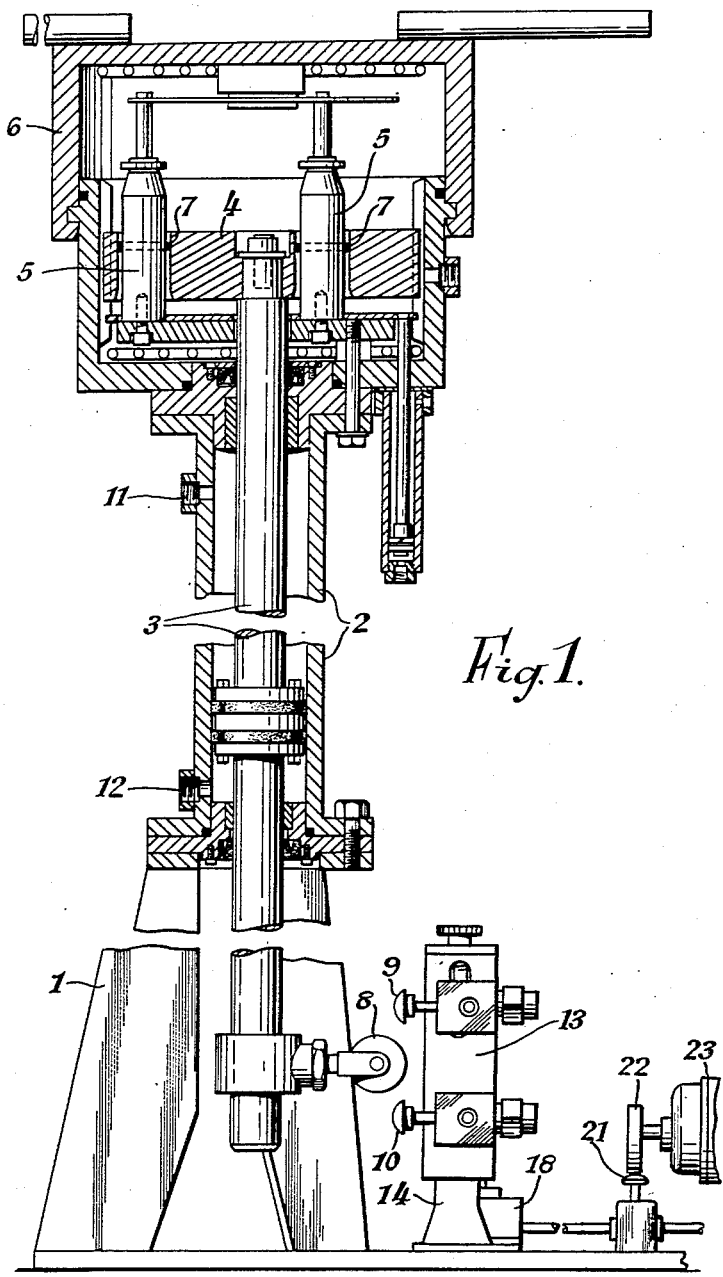

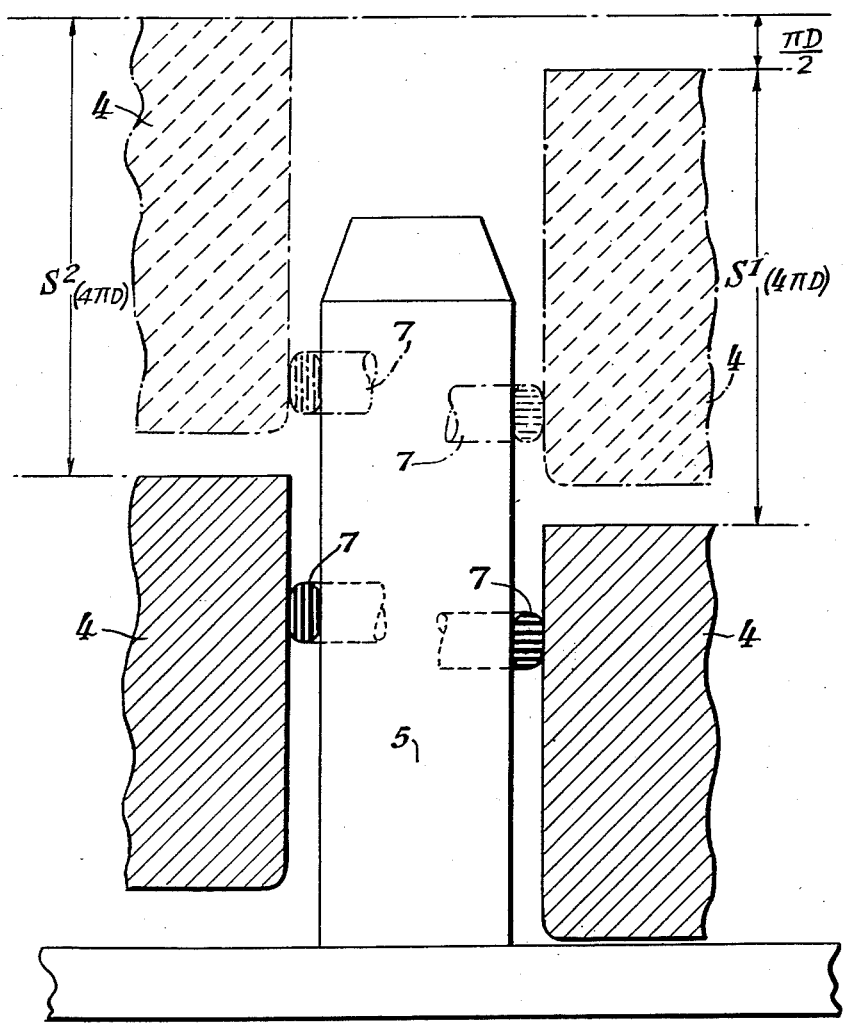

2,927,344

PRODUCTION OF RUBBER RINGS

Ernest T. Jagger and Brian Walton, Newcastle-upon-Tyne, England, assignors to George Angus & Company Limited, Newcastle-upon-Tyne, England Application October 8, 1956, Serial No. 614,617

Claims priority, application Great Britain October 10, 1955

8 Claims. (Cl. 18—2)

This invention relates to the production of rubber rings, particularly so-called O-rings used as oil seals in machinery. The term "rubber" is intended to include natural rubber, synthetic rubber, particularly an oil-resistant synthetic rubber such as a butadiene-acrylic nitrile copolymer, or other synthetic materials like rubber and commonly called elastomers.

The present invention is concerned with the production of rubber rings by a method in which a rubber blank is rolled, in an annular space between a relatively reciprocating, coaxial mandrel and surrounding cylinder, to finish or effect its formation into a circular ring of uniform circular cross-section.

The blank may be more or less pre-formed, for example may be a piece of extruded strip or a ring cut or stamped from suitable stock, and the rubber forming the blank may be in an unvulcanised or uncured state or partially cured state in which it is sufficiently plastic to be rolled into and retain the finished ring shape. Vulcanisation or completion of vulcanisation, or equivalent curing, can be carried out by heating either or both the mandrel and cylinder during the rolling process. The possibility of effecting or completing such vulcanisation or other curing after rolling of the rings to shape is not, however, precluded.

A difficulty encountered in making O-rings by the above-indicated rolling method is that finished rings are often found to be not truly circular in cross-section, but rather oval, and the present invention arises from an investigation of the cause of this.

In order for a rubber ring to be rolled in the annular space between a mandrel and surrounding cylinder, by relative axial movement of the mandrel and cylinder, the radial dimension of the annular space must be smaller than the mean diameter of the cross-section of the rubber ring because otherwise there would not be sufficient frictional contact with the rubber to cause it to roll instead of sliding relatively to either or both the mandrel or cylinder. Consequently, the rubber is constrained by radial compression between the mandrel and cylinder and has an elongated cross-sectional shape during rolling.

So long as the rubber is rolling, the radial compression to which it is subject is constantly changing in direction relatively to the cross-section of the rubber and, with truly uniform and continuous rolling, the rubber, having or acquiring during vulcanisation sufficient elasticity, would assume a uniform circular cross-sectional shape when released from constraint between the mandrel and cylinder on completion of vulcanisation.

However, the rolling produced by relative reciprocation of a mandrel and cylinder is not uniform and continuous because of the deceleration and acceleration on reversal of direction at each end of the stroke. This causes a compression dwell, i.e. a momentary holding of the compression across the rubber, at each end of the stroke. If the stroke is of constant length, the compression dwell occurs across the same cross-sectional portion of the rubber respectively at each end of the stroke and, if the length of constant stroke is a multiple of one-half the cross-sectional circumference of the rubber, the cross-sectional portion of the rubber which suffers the compression dwell is the same portion at both ends of the stroke. The consequence of constant-stroke reciprocating rolling of rubber rings is therefore that one or two cross-sectional portions of the rubber spend a longer total period under compression during vulcanisation than the remainder and, unless it should by chance happen that two such portions are at right-angles and exactly balance one another, they do not attain the same finished diameter as the remainder.

The above-described difficulty is overcome by the present invention which comprises a method of producing a rubber ring by rolling a rubber blank between a relatively reciprocating, coaxial mandrel and surrounding cylinder, in which the rolling stroke of the rubber is varied by variation of the relative reciprocation of the mandrel and cylinder.

By varying the rolling stroke it is ensured that not only one cross-sectional portion of the rubber is repeatedly subjected to the dwell under compression at either end of the stroke and by suitable arrangement of the variation of the stroke it can be ensured that the effects of the compression dwells are balanced out.

In apparatus for the production of rubber rings by the rolling method, it will usually be arranged that one member, either the mandrel or the cylinder, is fixed and the relative reciprocation obtained by movement of the other member. In such an arrangement, the variation of rolling stroke required to carry out the method of the present invention can be obtained simply by controlling the stroke of the moving member.

The preferred method of control is to give the reciprocating member, mandrel or cylinder, a constant length of stroke but to displace periodically the locus of the stroke of the reciprocating member, with respect to the fixed member, by a distance proportional to the cross-sectional diameter of the finished ring.

One example of apparatus for carrying out the present invention is illustrated on the accompanying drawings, in which:

Fig. 1 is a sectional front elevation of a multiple mandrel and cylinder machine for rolling O-rings.

Fig. 2 is a diametral cross-section of an O-ring.

Fig. 3 is a diagram to illustrate the displacement of the locus of the rolling stroke of a reciprocating member.

Figure 4:
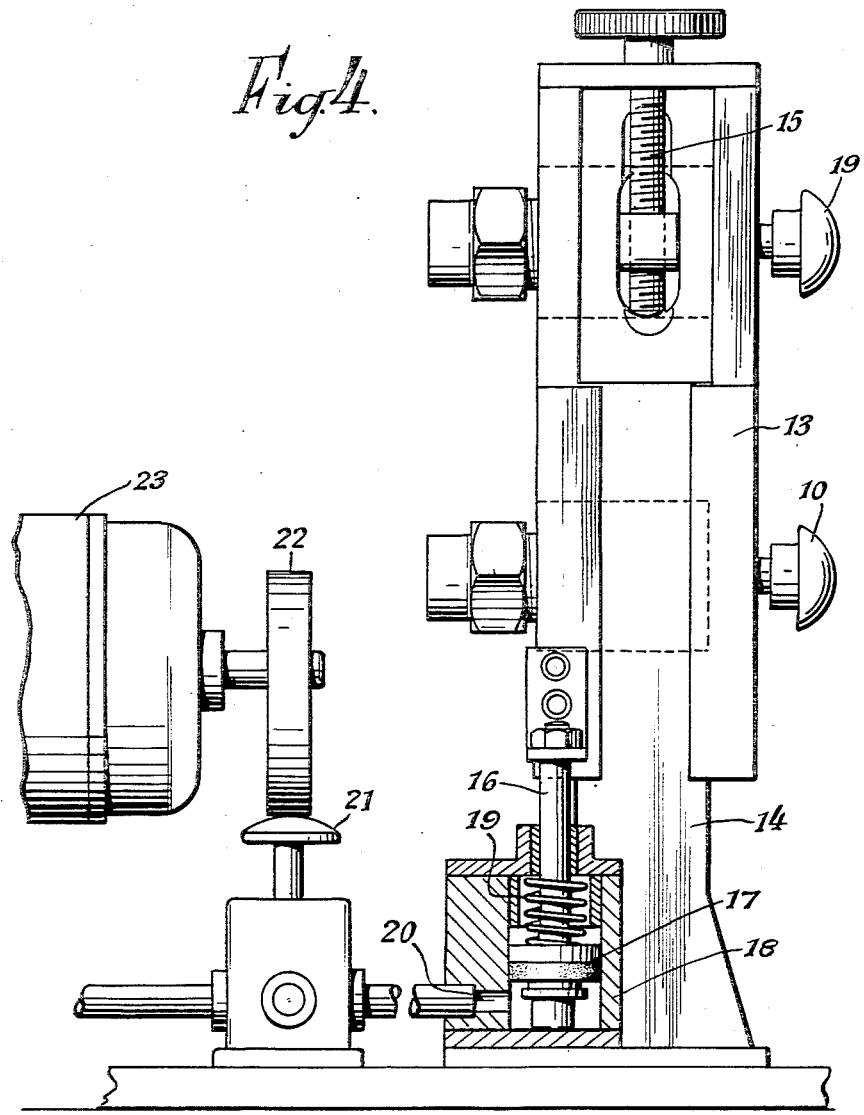
Fig. 4 is a part-sectional rear elevation showing the stroke-displacement mechanism on a larger scale.

The machine shown by Fig. 1 is fully described in our co-pending application Serial No. 593,722 and for the purpose of the present invention an outline description only need be given.

The machine is carried by a tripod pedestal 1 on which is mounted a cylindrical column 2 which forms the hydraulic cylinder for a vertical reciprocating shaft 3 on the head of which is carried a multiple cylinder block 4 encompassing a set of fixed mandrels 5 in a housing 6. The upper part of the housing can be raised for loading and removal of rubber rings 7 which are rolled to shape, each in one of the annular spaces between the mandrels and cylinders, by reciprocation of the shaft 3. The housing 6 is heated to effect vulcanisation of the rubber rings and can be maintained under air or steam pressure.

The change of direction of movement of the shaft 3, for reciprocation, is effected automatically by a roller 8, adjustably fixed on the shaft 3, encountering and operating a pair of pneumatic plunger valves 9 and 10 which operate a hydraulic valve (not shown) to change over the supply and exhaust of hydraulic liquid through the ports 11 and 12 of the hydraulic cylinder 2. An overriding manual control for the hydraulic valve is provided so that the operator can move the shaft 3 in either direction up to its full stroke, the valves 9 and 10 providing only for automatic reciprocation of the shaft during the actual rolling of rings.

The method of varying the rolling stroke by displacement of the locus of the stroke of the reciprocating member, i.e. the cylinder block 4, is illustrated diagrammatically by Fig. 3, the right-hand side of which shows the positions occupied by the cylinder block 4 and ring 7 at either end of a rolling stroke $S^1$ whilst the left-hand side shows the corresponding positions for a rolling stroke $S^2$ of the same length but slightly different locus.

In the example illustrated, the stroke length ($S^1$ or $S^2$) is equal to $4\pi D$, in which D is the cross-sectional diameter of the finished ring (see Fig. 2), and this stroke rolls the ring through twice its circumference ($2\pi D$). It will be seen therefore that, at each end of such a stroke of constant length and locus, the same cross-sectional portion of the ring is subjected to a dwell under compression and this results in the finished ring being of slightly oval cross-section.

By displacing periodically the locus of the stroke of the cylinder block 4, from $S^1$ to $S^2$, a different cross-sectional portion of the ring becomes subjected to the compression dwell and, if the amount of displacement is $\pi D/2$ as illustrated, the directions of the two compression dwells within the rubber of the ring are at right-angles and their effects on the finished ring balance out.

One arrangement for effecting periodic displacement of the locus of the rolling stroke of the cylinder block 4 is shown by Fig. 4.

The automatic stroke-reversing pneumatic valves 9 and 10 are mounted on a frame 13 vertically slidable on a vertical slide-way bracket 14. The vertical separation of the valves 9 and 10 can be altered, for stroke-length adjustment, by a screw 15 which sets the position of the valve 9 on the frame 13.

The frame 13 is supported in its vertical position by a rod 16 the lower end of which is provided with a piston 17 in a pneumatic cylinder 18. A return spring 19 is provided above the piston 17.

The pneumatic cylinder 18 is supplied with compressed air through a port 20 under the control of a plunger valve 21 operated by a cam 22 on the reduction gear shaft of a synchronous electric motor 23.

The motor 23 is set to run at a constant speed and ratio with respect to the reciprocation of the shaft 3 so as to actuate the valve 21 periodically at the ends of equal sequences of rolling strokes. For example, if the rolling strokes have a frequency of 12 per minute, the valve 21 is actuated at a rate of 4 times per minute.

Successive actuations of the valve 21 alternately admit air to and release it from the cylinder 18. Thereby the piston 17, and therewith the frame 13 and valves 9 and 10, is alternately held raised and lowered for equal sequences of strokes. The stroke of the piston 17 is selected to be equal to the desired displacement of the locus of the rolling stroke of the cylinder block 4 and therefore in the lowered position of the piston there takes place one sequence of strokes, corresponding to $S^1$ in Fig. 3, whilst in the raised position of the piston there takes place another sequence of strokes ($S^2$).

It will of course be understood that the apparatus described and the examples given above are intended only to illustrate a preferred method of varying the rolling stroke in the rolling of rubber rings. Other forms of variation, for example cyclical variation of the length of the rolling stroke, could be carried out to obtain the desired result of balancing the cross-sectional compression of the rubber during the rolling of rubber rings.

Also it should be understood that the explanation given above with reference to the diagram Fig. 3 is a theoretical treatment of a special case for the purpose of showing the basis of the invention and that the same conditions are not likely to be achieved exactly in practice. In dealing with a deformable material such as rubber during vulcanisation there are bound to be varying and uncontrollable factors, such as slip between the rubber and the rolling surfaces. For this reason, it is not found possible to avoid ovality in rolled rubber rings by the comparatively simple expedient of carefully selecting the length of a constant rolling stroke to produce the two compression dwells at the two ends of the stroke at right angles with respect to the cross-section of the rubber. A constant rolling stroke is bound to have some uncontrollable variation in effect on the rubber in practice and by deliberately introducing a further variation, in accordance with the present invention, the effects of compression dwells can be uniformly distributed around the rubber and rings of good circular cross-section are produced.

We claim:

1. A method of producing a rubber ring comprising introducing rubber into the annular space between a mandrel and a cylinder coaxially surrounding said mandrel, said rubber being compressed between said mandrel and said cylinder, and effecting reciprocating rolling of said rubber by relative reciprocation of said mandrel and cylinder, in which the rolling stroke of said reciprocating rolling of said rubber is varied during said rolling by variation of said relative reciprocation of said mandrel and cylinder.

2. A method according to claim 1, in which the locus of said relative reciprocation of said mandrel and cylinder is periodically displaced.

3. Apparatus comprising a pair of coaxial members having opposed cylindrical surfaces spaced apart and defining between them an annular cylindrical space, means for introducing rubber blanks into said space, means for effecting relative reciprocation of said members to roll said rubber blanks into rings, and means for varying said relative reciprocation of said members during said relative reciprocation of said members.

4. Apparatus according to claim 3, in which one of said members is fixed and the other is axially movable, said means for effecting relative reciprocation effects axial reciprocation of said movable member, and said means for varying said relative reciprocation effects periodic displacement of the locus of reciprocation of said movable member with respect to said fixed member.

5. A method of producing a rubber ring comprising introducing rubber into the annular space between a mandrel and a cylinder coaxially surrounding said mandrel, said rubber being compressed between said mandrel and said cylinder, effecting reciprocating rolling of said rubber by relative reciprocation of said mandrel and cylinder, and applying heat to effect vulcanization of said rubber during said rolling, in which the rolling stroke of said reciprocating rolling of said rubber is varied during said rolling by variation of said relative reciprocation of said mandrel and cylinder.

6. A method according to claim 5, in which the locus of said relative reciprocation of said mandrel and cylinder is periodically displaced.

7. Apparatus comprising a pair of coaxial members having opposed cylindrical surfaces spaced apart and defining between them an annular cylindrical space, means for introducing rubber blanks into said space, means for effecting relative reciprocation of said members to roll said rubber blanks into rings, means for heating said space for vulcanization of said rings, and means for varying said relative reciprocation of said members during said relative reciprocation of said members.

8. Apparatus according to claim 7, in which one of said members is fixed and the other is axially movable, said means for effecting relative reciprocation effects axial reciprocation of said movable member, and said means for varying said relative reciprocation effects periodic displacement of the locus of reciprocation of said movable member with respect to said fixed member.

References Cited in the file of this patent

UNITED STATES PATENTS

| | | |
|---|---|---|
| 2,116,906 | Miller | May 10, 1938 |
| 2,535,124 | Edland | Dec. 26, 1950 |
| 2,584,514 | Thompson | Feb. 5, 1952 |